United States Patent [19]
Adamson et al.

[11] Patent Number: 5,524,032
[45] Date of Patent: Jun. 4, 1996

[54] NUCLEAR FUEL CLADDING HAVING AN ALLOYED ZIRCONIUM BARRIER LAYER

[75] Inventors: Ronald B. Adamson, Fremont; Daniel R. Lutz, San Jose; Joseph S. Armijo, Saratoga; Herman S. Rosenbaum, Fremont, all of Calif.

[73] Assignee: General Electric Company, San Jose, Calif.

[21] Appl. No.: 215,458

[22] Filed: Mar. 21, 1994

Related U.S. Application Data

[63] Continuation-in-part of Ser. No. 92,188, Jul. 14, 1993, Pat. No. 5,341,407.
[51] Int. Cl.$^6$ .................................................. G21C 3/00
[52] U.S. Cl. .................... 376/409; 376/414; 376/417; 376/416; 376/457
[58] Field of Search ................................. 376/409, 414, 376/417, 416, 457, 287, 291, 347; 148/672, 714; 29/25.02; 252/62.3 R; 250/518.1

[56] References Cited

U.S. PATENT DOCUMENTS

| | | | |
|---|---|---|---|
| 2,849,387 | 8/1958 | Brugmann | 376/414 |
| 2,873,238 | 2/1959 | Ohlinger et al. | 228/132 |
| 3,018,238 | 1/1962 | Layer et al. | 204/154.2 |
| 3,085,059 | 4/1963 | Burnham | 376/416 |
| 3,088,893 | 5/1963 | Spalaris | 228/131 |
| 3,108,936 | 10/1963 | Gale | 376/426 |
| 3,212,988 | 10/1965 | Ringot | 376/416 |
| 3,230,150 | 1/1966 | Martin et al. | 376/416 |
| 3,354,043 | 1/1967 | Boettcher | 376/424 |
| 3,442,761 | 5/1969 | Feraday | 376/417 |
| 3,502,549 | 3/1970 | Charveriat | 205/228 |

(List continued on next page.)

FOREIGN PATENT DOCUMENTS

| | | |
|---|---|---|
| 1529664 | 10/1978 | United Kingdom . |
| 92/08818 | 5/1992 | WIPO . |

OTHER PUBLICATIONS

"Design and Fabrication of Fuel Rods Clad with Stainless Steel Lined Zircaloy-2," Baroch, General Electric, Feb. 1964.
"Electroplating on Zircaloy-2 with Copper," Caretta et al., Energy Nucleare, vol. 11/n.9, Sep. 1964.
"Stability and Compatibility of Hydrogen Barriers Applied to Zirconium Alloys," Brossa et al. Euratom, Jan. 1969.
"Electroplating on Zirconium and Zirconium Tin," Schickner et al., Batelle Memorial Institute, Jul. 1952.
"Reactor Development Program Progress Report," Argonne National Lab., Aug. 1973.
U.S. Patent Application Serial No. 08/011,559, filed Feb. 1, 1993, entitled "Composite Nuclear Fuel Container and Method for Producing Same"; inventors: Rosenbaum, Adamson & Cheng.
U.S. Patent Application Serial No. 06/374,162, filed May 3, 1982; entitled "Buried Zirconium Layer", inventor: Armijo.
U.S. Patent Application Serial No. 07/894,887, filed Jun. 8, 1992, entitled "Method for Producing Heat Treated Composite Nuclear Fuel Containers", inventor: Rosenbaum.

(List continued on next page.)

Primary Examiner—Donald P. Walsh
Assistant Examiner—Meena Chelliah
Attorney, Agent, or Firm—James E. McGinness; Jeffrey K. Weaver

[57] ABSTRACT

A cladding tube having a cross-section and including (1) a zirconium alloy outer circumferential substrate having an inner surface and having one or more alloying elements, (2) a zirconium barrier layer bonded to the inner surface of the outer circumferential substrate and being alloyed with the one or more alloying elements, and (3) a zirconium alloy inner circumferential liner bonded to the inner surface of the zirconium barrier layer. The barrier layer will have a concentration profile including a diffusion layer extending from the barrier layer's inner surface (facing nuclear fuel) to the barrier layer's interior (between the barrier layer's inner and outer surfaces). At the interior edge of the diffusion layer, there will be substantially no alloying elements. At the outer edge of the diffusion layer (the barrier layer's inner surface), the maximum concentration of alloying elements will occur.

17 Claims, 3 Drawing Sheets

U.S. PATENT DOCUMENTS

| | | | |
|---|---|---|---|
| 3,620,691 | 11/1971 | Rubel | 29/191 |
| 3,689,324 | 9/1972 | Wiener et al. | 148/11.5 |
| 3,925,151 | 12/1975 | Klepter | 376/415 |
| 3,969,186 | 7/1976 | Thompson | 376/418 |
| 4,022,662 | 5/1977 | Gordon et al. | 376/416 |
| 4,029,545 | 6/1977 | Gordon et al. | 376/417 |
| 4,045,288 | 8/1977 | Armijo | 376/417 |
| 4,200,492 | 4/1980 | Armijo et al. | 376/417 |
| 4,372,817 | 2/1983 | Armijo et al. | 376/417 |
| 4,406,012 | 9/1983 | Gordon et al. | 376/414 |
| 4,573,629 | 3/1986 | Imahashi et al. | 228/173.2 |
| 4,576,654 | 3/1986 | Eddens et al. | 448/11.5 F |
| 4,718,949 | 1/1988 | Takase et al. | 148/11.5 F |
| 4,778,648 | 10/1988 | Ferrari | 376/457 |
| 4,876,064 | 10/1989 | Taylor | 420/422 |
| 4,894,203 | 1/1990 | Adamson | 376/416 |
| 5,247,550 | 9/1993 | Perkins et al. | 376/416 |
| 5,297,177 | 3/1994 | Inagaki et al. | 376/462 |

OTHER PUBLICATIONS

USSN 08/142,034, "Process for Improving Corrosion Resistance of Zirconium Alloy Barrier Cladding", filed Oct. 28, 1993.

Cheng and Adamson, "Mechanistic Studies of Zircaloy Nodular Corrosion", Zirconium in the Nuclear Industry: Seventh International Symposium, ASTM STP 939, pp. 387–416 (1987).

NUCLEAR FUEL CLADDING HAVING AN ALLOYED ZIRCONIUM BARRIER LAYER

CROSS-REFERENCE TO RELATED APPLICATIONS

This application is a continuation-in-part of U.S. patent application Ser. No. 08/092,188 entitled INNER LINERS FOR FUEL CLADDING HAVING ZIRCONIUM BARRIER LAYERS which was filed on Jul. 14, 1993, now U.S. Pat. No. 5,341,407 assigned to the assignee hereof, and is incorporated herein by reference in its entirety for all purposes.

BACKGROUND OF THE INVENTION

This invention relates to a nuclear fuel cladding having an outer substrate, zirconium barrier, and an inner liner. More particularly, the zirconium barrier layer is at least partially alloyed to resist accelerated corrosion.

Nuclear reactors have their fuel contained in sealed cladding for the isolation of the nuclear fuel from the moderator/coolant system. The term cladding, as used herein, refers to a zirconium based alloy tube. Often the cladding will be composed of various layers including a zirconium alloy substrate and an unalloyed zirconium barrier.

The cladding—nominally in the order of 0.030 inches thick— is formed in the shape of a tube with the nuclear fuel contained typically in pellet form therein. These pellets are stacked in contact with one another for almost the entire length of each cladding tube, which cladding tube is in the order of 160 inches in length. Typically, the cladding tube is provided with springs for maintaining the axial position of the fuel pellets and so-called "getters" for absorbing excess moisture. The internal portions of the fuel rod are pressurized with helium to help conduct the heat from the fuel material to the cladding.

Zirconium and its alloys, under normal circumstances, are excellent for nuclear fuel cladding since they have low neutron absorption cross sections and, at temperatures below about 350° C., are strong, ductile, extremely stable and relatively nonreactive in the presence of demineralized water or steam. "Zircaloys" are a family of corrosion-resistant zirconium alloy cladding materials. They are composed of 98– 99% by weight zirconium, with the balance being tin, iron, chromium, and nickel. "Zircaloy-2" and "Zircaloy-4" are two widely-used zirconium-based alloys for cladding. Zircaloy-2 has on a weight basis about 1.2 to 1.7 percent tin; 0.13–0.20 percent iron; 0.06–0.15 percent chromium and 0.05 to 0.08 percent nickel. Zircaloy-4 has essentially no nickel and about 0.2% iron but is otherwise substantially similar to Zircaloy-2.

Splitting of Zircaloy cladding may occur due to various causes including debris induced fretting and pellet-cladding interaction. In the first of these, debris lodges next to the cladding and vibrates or frets against the cladding wall under the influence of the passing steam/water mixture. Such vibration continues until the cladding wall is penetrated. Pellet-cladding interaction is caused by the interactions between the nuclear fuel, the cladding, and the fission products produced during the nuclear reaction. It has been found that this undesirable effect is due to localized mechanical stresses on the fuel cladding resulting from differential expansion and friction between the fuel and the cladding in coincidence with corrosive fission product species causing stress corrosion cracking.

To combat defects due to pellet-cladding interaction, some cladding includes pure zirconium barrier layers metallurgically bonded to the inner surface of the tubing. The pioneering work on barrier layer cladding is described in U.S. Pat. Nos. 4,200,492 and 4,372,817 to Armijo and Coffin, U.S. Pat. No. 4,610,842 to Vannesjo, and U.S. Pat. No. 4,894,203 to Adamson, each of which is incorporated herein by reference for all purposes. Barrier layers have been found to effectively prevent damage to the cladding due to interaction with the pellet. However, if the cladding wall is compromised in some manner (e.g. perforated or split by debris fretting), and water enters the fuel rod interior, the protection afforded by the barrier layer can be reduced. This is because the steam produced by water within the fuel rod can very rapidly oxidize the barrier layer. Because of the speed at which this type of corrosion occurs, it is sometimes referred to as "accelerated" corrosion.

To protect the zirconium barrier from oxidation should a cladding breach occur, a three-layer structure may be employed. See e.g., U.S. patent application Ser. No. 08/091,672 entitled METHOD FOR MAKING FUEL CLADDING HAVING ZIRCONIUM BARRIER LAYERS AND INNER LINERS and U.S. patent application Ser. No. 08/092,188 entitled INNER LINERS FOR FUEL CLADDING HAVING ZIRCONIUM BARRIER LAYERS, both of which were filed on Jul. 14, 1993 and assigned to the assignee hereof. Both applications are incorporated herein by reference in their entirety for all purposes. In addition to the substrate and zirconium barrier, three-layer cladding includes a very thin corrosion resistant inner liner bonded to the fuel side of the barrier. Typically, the inner layer will be made from a Zircaloy or modified Zircaloy. If the cladding is breached and steam forms in the fuel rod interior, the inner liner will protect the barrier from rapid oxidation. Although this three layer design represents a significant advance, methods of forming three-layer cladding can be difficult to implement to perfection. Sometimes tears or other defects occur in the very thin inner liner during fabrication.

While three Layer cladding taught in U.S. patent application Ser. No. 08/092,188 provides substantial protection against damage from pellet-cladding interaction and accelerated corrosion, it is still desirable to develop other claddings having the same or improved properties.

SUMMARY OF THE INVENTION

The present invention provides a cladding tube having a cross-section and including (1) a zirconium alloy outer circumferential substrate having an inner surface and having one or more alloying elements, (2) a zirconium barrier layer bonded to the inner surface of the outer circumferential substrate, and having a width defined between its inner and or surface and being alloyed with the one or more alloying elements, and (3) a zirconium alloy inner circumferential liner bonded to the inner surface of the zirconium barrier layer. The alloying elements present in the barrier layer (at least those alloys at the interface of the barrier layer with the substrate) are added to provide some measure of corrosion protection for the barrier layer.

In a preferred embodiment, the zirconium barrier layer has concentration profile in which (a) alloying elements are present at an excess concentration (beyond that found in conventional unalloyed zirconium barrier layers) of at least about 0.03 percent iron and at least about 0.01 percent nickel at the zirconium barrier layer's interface with the inner liner, and (b) substantially no alloying elements (beyond the concentration found in unalloyed zirconium) are present at a distance of at most about 10% of the barrier layer's total radial thickness from the zirconium barrier layer's interface with the inner liner. Preferably, substantially no alloying elements are present at a distance of at most about 5% the barrier layer's total thickness from the zirconium barrier layer's interface with the inner liner. In an especially preferred embodiment, the alloying elements are present at an excess concentration of at least about 0.03 percent iron and at least about 0.01 percent nickel at the zirconium barrier layer's interface with the outer circumferential substrate. The term "diffusion layer" is used herein to describe the region between the barrier layer's interface with the inner liner and the location in the barrier layer's interior where the concentration of alloying elements fast drops to substantially zero. There will, of course, be a concentration gradient in the diffusion layer.

In preferred embodiments, the inner liner comprises a Zircaloy or modified Zircaloy. Preferably, the inner liner is made from a low tin and/or low oxygen modified Zircaloy so that the liner is more compliant than conventional Zircaloys, thus providing substantial protection against damage from pellet-cladding interaction. For example, the inner liner may have less than about 900 ppm oxygen by weight and less than about 1.2 percent tin by weight. In an alternative embodiment, the inner liner is a high nickel, high iron modified Zircaloy. Such alloys provide additional corrosion protection. In either embodiment, the inner liner preferably has an average thickness of between about 10 and 50 micrometers.

The presence of alloying elements in the barrier layer (in a diffusion layer or other location) provides additional protection against accelerated corrosion should steam enter the cladding interior through a defect in the cladding. These and other advantages and features of the present invention will be presented in more detail in the following specification of the invention and the figures.

DESCRIPTION OF THE PREFERRED EMBODIMENTS

I. THE CLADDING TUBE STRUCTURE

As used herein, the term "tubing" refers to a metal tube having various uses, and the term "fuel rod container" or simply "container" refers to tubing used in fuel rods to enclose fuel pellets. Sometimes the fuel rod container is referred to as "cladding" or "cladding tube".

Figure 1:
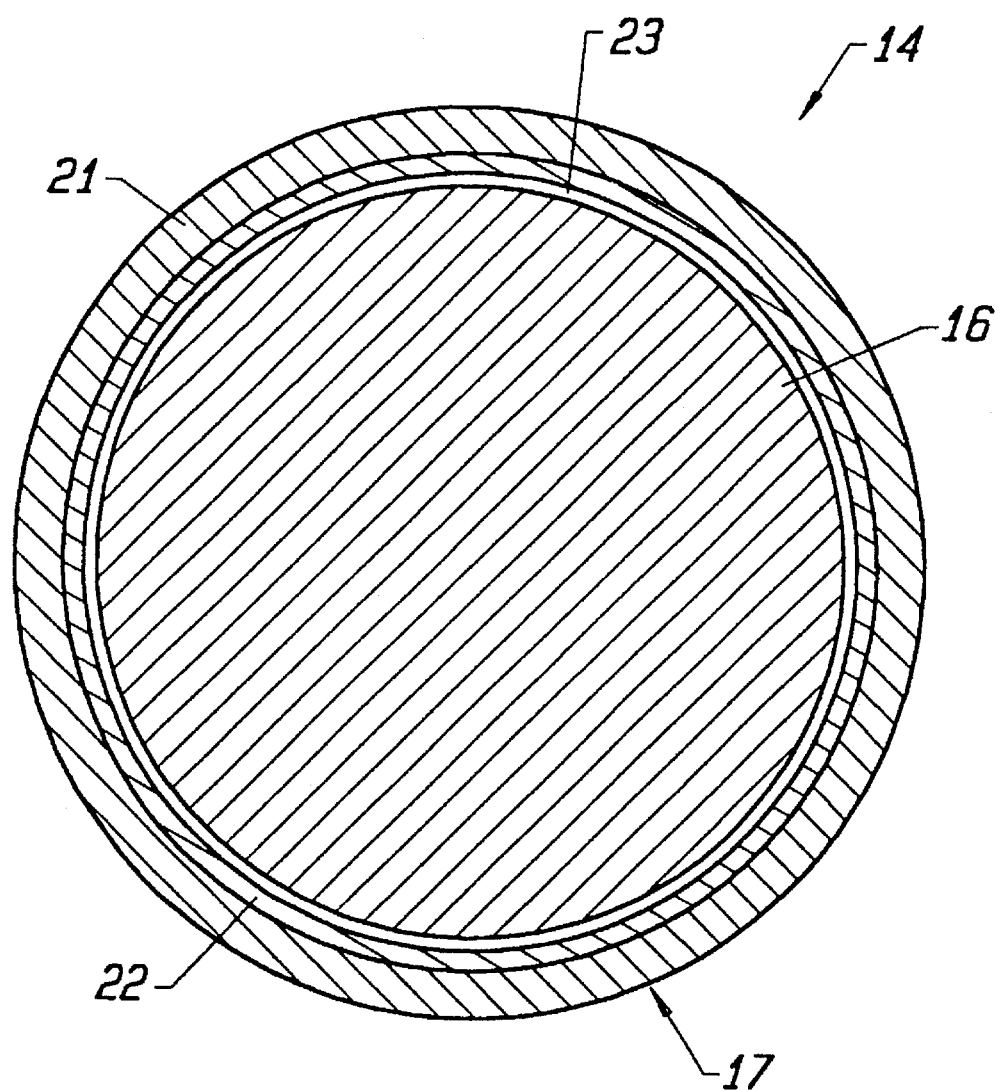
FIG. 1 is a cross sectional view of a nuclear fuel element of this invention having a substrate, a barrier layer, and an inner liner.

Referring to FIG. 1, a fuel element 14 (commonly referred to as a fuel rod) includes a fuel rod container 17 surrounding a fuel material core 16. The fuel element 14 is designed to provide excellent thermal contact between the fuel rod container 17 and the fuel material core 16, a minimum of parasitic neutron absorption, and resistance to bowing and vibration which is occasionally caused by flow of coolant at high velocity. The fuel material core is typically a plurality of fuel pellets of fissionable and/or fertile material. The fuel core may have various shapes, such as cylindrical pellets, spheres, or small particles. Various nuclear fuels may be used, including uranium compounds, thorium compounds and mixtures thereof. A preferred fuel is uranium dioxide or a mixture comprising uranium dioxide and plutonium dioxide.

The container 17 is a composite cladding having a structure including a substrate 21, a zirconium barrier 22, and an inner layer or liner 23. The substrate forms the outer circumferential region of a cladding tube, the inner liner forms an inner circumferential region, and the zirconium barrier is located between the substrate and inner liner. In alternative preferred embodiments, the composite cladding has no well-defined inner liner. Rather, the inner regions of zirconium barrier (closer to the fuel) contain a high concentration of alloying elements while the interior regions of the barrier layer (between the barrier layer inner and outer surfaces) contain lower concentrations of alloying elements.

The substrate may be made from a conventional cladding material such as a stainless steel or, preferably, a zirconium alloy. Suitable zirconium alloys for the substrate preferably include at least about 98% zirconium, up to about 0.25% iron, up to about 0.1% nickel, up to about 0.25% chromium, and up to about 1.7% tin (all percents by weight). Other alloying elements may include niobium, bismuth, molybdenum, as well as various other elements used in the art. Most generally, any zirconium alloy with suitable corrosive resistance to BWR water and with sufficient strength and ductility may be employed.

In a preferred embodiment of this invention, the substrate is Zircaloy-2 or Zircaloy-4. In other preferred embodiments, "Zirlo"—a zirconium based alloy containing about 1% tin, about 1% niobium, and less than about 0.2% iron—is employed. Other exemplary substrate alloys include zirconium/2.5% niobium, "NSF" alloys (about 1% tin, about 0.2–0.5% iron, about 0.05% nickel, about 0.6–1% niobium, and the balance zirconium), "Valloy" (about 0.1% iron, about 1.2% chromium, and the balance zirconium), other high chromium content alloys, and "Excel" or "Excellite" (about 0.3% niobium, about 0.3 molybdenum, about 1.2 to 1.5% tin, and the balance zirconium). Still other exemplary alloys include various bismuth-containing zirconium alloys such as those described in U.S. Pat. No. 4,876,064 issued to Taylor on Oct. 24, 1989. These alloys include, for example, (1) about 0.5 to 2.5 weight percent bismuth, (2) about 0.5 to 2.3 weight percent of a mixture of bismuth and tin plus about 0.5 to 1.0 weight percent of solute which may be niobium, molybdenum, tellurium, or mixtures thereof, or (3) about 0.5 to 2.5 weight percent of a mixture of tin and bismuth plus about 0.3 to 1.0 weight percent tellurium.

In some preferred embodiments, the substrate will have a microstructure (i.e. precipitate size distribution) that resists corrosion and/or crack propagation. It is known that the microstructure of Zircaloys and other alloys can be controlled by the anneal temperature and time as well as other fabrication parameters. It is also known that in boiling water reactors (BWRs), smaller precipitates generally provide superior resistance to corrosion while in pressurized water reactors (PWRs), larger precipitates generally provide superior resistance to corrosion. In either environment, coarse precipitates provide improved resistance to axial crack propagation. In a preferred embodiment, the substrate will have a dense distribution of fine precipitate (e.g., between about 0.01 and 0.1 micrometers in diameter) in the outer regions (radially) of the substrate and a less dense distribution of coarse precipitates (e.g., between about 0.1 and 1 micrometers in diameter) in the inner regions of the substrate. Detailed discussions of Zircaloy microstructure and methods of fabricating cladding having a desired microstructure are found in U.S. patent application Ser. No. 08/052,793 entitled ZIRCALOY TUBING HAVING HIGH RESISTANCE TO CRACK PROPAGATION and U.S. patent application Ser. No. 08/052,791 entitled METHOD OF FABRICATING ZIRCALOY TUBING HAVING HIGH RESISTANCE TO CRACK PROPAGATION, both of which were filed on Apr. 23, 1993, assigned to the assignee hereof, and are incorporated herein by reference for all purposes.

Metallurgically bonded on the inside surface of substrate 21 is the zirconium barrier 22. See the above-mentioned U.S. Pat. Nos. 4,200,492 and 4,372,817 to Armijo and Coffin, U.S. Pat. No. 4,610,842 to Vannesjo, and U.S. Pat. No. 4,894,203 to Adamson. Because the zirconium barrier is at least partially alloyed in the present invention, it resists accelerated corrosion in the event of a cladding breach and the subsequent ingress of steam. In the present invention, such protection is provided by imparting a significant alloying element concentration to the barrier layer through a diffusion anneal step. This will drive some of the elements from the substrate and inner liner into the zirconium barrier layer. As is well-known in the art, the presence of alloying elements such as iron and nickel in zirconium can provide resistance to accelerated corrosion.

In preferred embodiments, the thickness of the barrier layer is between about 50 and 200 micrometers (approximately 2 to 8 mils) and more preferably between about 75 and 115 micrometers (approximately 3.2 to 4.7 mils). In a typical cladding, the zirconium barrier forms between about 5% to about 30% of the thickness or cross-section of the cladding.

Generally, the zirconium barrier layer is initially in an "unalloyed" form. Suitable barrier layers are made from "low oxygen sponge" grade zirconium, "reactor grade sponge" zirconium, and higher purity "crystal bar zirconium". Generally, there are at least 1,000 parts per million (ppm) by weight and less than about 5,000 ppm impurities in sponge zirconium and preferably less than 4,200 ppm. Sponge zirconium is typically prepared by reduction with elemental magnesium at elevated temperatures at atmospheric pressure. The reaction takes place in an inert atmosphere such as helium or argon. Crystal bar zirconium is produced from sponge zirconium by converting the zirconium metal in sponge zirconium to zirconium tetraiodide vapor and then decomposing the iodide on an incandescent wire. Crystal bar zirconium is more expensive than sponge zirconium, but has few impurities and has greater resistance to radiation damage.

As noted, the zirconium barrier in conventional barrier layer cladding serves to provide the compliance necessary to counteract the detrimental effects of pellet-cladding interaction. However, it is also important that the barrier layer resist accelerated corrosion that can result if steam enters cladding interior through a defect. The inner liner provides some protection against accelerated corrosion, but in case the liner has tears or other defects, the barrier layer should have some additional corrosion protection. In the present invention, such protection is provided by imparting a significant alloying element concentration to the barrier layer through, for example, a diffusion anneal step. This will drive some of the elements from the substrate and inner liner into the zirconium barrier layer. As is well-known in the art, the presence of alloying elements such as iron and nickel in zirconium can provide resistance to accelerated corrosion.

Throughout the present specification, various references are made to "alloying elements" in the zirconium barrier layer or to an "alloyed" zirconium barrier layer. Such references are intended to include cladding tubes in which the concentration of alloying elements (e.g., iron and nickel) purposely added is in excess of the concentration of those elements in a conventional "unalloyed" zirconium barrier layer. As explained above, conventional barrier layers made to specification are of only finite purity (i.e., they typically contain some low concentration of elements). Thus, all values provided herein for alloying element concentrations refer to concentrations beyond those conventionally found in zirconium barrier layers. For example, if ziconium used in "unalloyed" barrier layers is made to a specification of 500 ppm iron, an alloyed zirconium barrier layer having 0.1 weight percent iron, will contain that weight percent plus the 500 ppm of conventional zirconium.

The alloyed barrier layers of this invention may have alloying elements in a concentration sufficient to cause precipitation. However, this is not critical to present invention. The alloying elements should simply be present in concentrations sufficient to provide some measure of protection against accelerated corrosion without significantly compromising the compliance of the zirconium. It is especially important that the alloying elements be present at the inner surface of the zirconium barrier layer (adjacent to the inner liner). This ensures that if the barrier layer becomes exposed to a corrosive environment as a result of a defect in the inner liner, the barrier layer's inner surface will have some measure of corrosion protection. Suitable concentrations of alloying elements at the zirconium barrier inner surface are (on a per weight basis) at least about 0.03 percent iron, at least about 0.01 percent chromium, and at least about 0.01 percent nickel (all concentrations beyond the "unalloyed" levels for the alloying elements). More preferably, these concentrations should be between about 0.03–0.40 percent iron, between about 0.01–0.20 percent chromium, and between about 0.01–0.20 percent nickel (again, beyond the unalloyed levels).

The barrier layer will have a diffusion layer extending from the barrier layer's inner surface (facing the fuel) to the barrier layer's interior (the interior being defined between the barrier layer's inner and outer surfaces). At the interior edge of the diffusion layer, there will be substantially no alloying elements beyond those normally present in unalloyed sponge or crystal bar zirconium (e.g., chromium— 70 ppm or less; iron—500 ppm or less; and nickel—70 ppm or less). This will be the concentration at the interior edge of the diffusion layer. At the barrier layer's outer edge of the diffusion layer (the barrier layer's inner surface), the maximum concentration of alloying elements will occur. Preferably, the diffusion layer extends from the barrier layer's interface with the inner liner toward the interior covering at most about 10% of barrier layer's total width. This corresponds to about 8 micrometers of a conventional 75 micrometer barrier layer's total radial thickness. In more preferred embodiments, the diffusion layer has a thickness of at most about 5% of the barriers layer's total width.

As will be discussed below, the diffusion layer is typically formed by a diffusion anneal which drives some of the alloying elements from the inner liner into the barrier layer. During this anneal step, some of the alloying elements in the outer circumferential substrate will also diffuse into the barrier layer, albeit at the substrate/barrier layer interface. This will result in the formation of two diffusion layers across the barrier layer in the radial direction. The alloying elements at the zirconium barrier layer's interface with the outer circumferential substrate are preferably present in concentrations of between about 0.03–0.40 percent iron, between about 0.01–0.20 percent chromium, and between about 0.01–0.20 percent nickel (all concentrations beyond the unalloyed levels). Because alloying elements can harden pure zirconium, it is important that the interior regions of the barrier layer (those interior to the diffusion layers) remain substantially unalloyed. This allows the barrier layer to remain sufficiently compliant to resist damage caused by the pellet-cladding interaction.

Metallurgically bonded to the inside surface of the zirconium barrier 22 is the inner liner 23. As shown, the inner liner is the portion of the composite cladding closest to the nuclear fuel material 16. This layer provides some protection of the zirconium barrier from rapid oxidation should the fuel element interior come in contact with steam. Thus, the inner liner should be a relatively corrosion resistant material such as Zircaloy. However, modified Zircaloys and other corrosion resistant materials may also be employed. For example, the inner liner may be softer than conventional Zircaloy so that crack initiation and propagation on the inner surface of the cladding tube are minimized. See U.S. patent application Ser. No. 08/092,188, previously incorporated herein by reference. In an alternative embodiment, the inner liner may be made from an alloy designed to have strongly hydrogen absorbing properties. One such material is a zirconium alloy having a high concentration of nickel (e.g., up to 15% nickel).

In some embodiments, the inner liner is so thin that it is completely consumed by interdiffusion with the barrier layer in a diffusion anneal. The resulting cladding contains a barrier layer having significant resistance to accelerated corrosion because of the increased alloying element concentration at the barrier layer inner region (where it is most susceptible to corrosion). The diffusion anneal also homogenizes the concentration distribution over the barrier layer's inner surface. (This advantage of the diffusion anneal also results when the inner liner is retained in the final cladding.) Thus, if there were any tears or other defects in the inner liner (that could provide a site for accelerated corrosion), the diffusion anneal causes the alloying elements to move into the barrier layer at these defects sites to protect against accelerated corrosion. Aside from the inner liner being completely consumed in a diffusion anneal, the product cladding tube is structurally similar to the three-layer cladding tube described above (i.e., the barrier layer will have diffusion layers at both of its edges).

If the cladding tube contains an inner liner, that liner may be made from many different materials. For example, preferred low-tin inner liner compositions of this invention will be zirconium alloys (e.g., modified Zircaloys) having less than about 1.2% tin by weight. One class of suitable alloys include at least about 98% zirconium, up to about 0.24% iron and less than about 1.2% tin (all percents by weight). Some liner alloys will also contain between about 0.05 and 0.15 chromium and/or between about 0.03 and 0.08 nickel. Other additives may include niobium, bismuth, and molybdenum, as well as various other elements used in the art.

Other preferred zirconium alloys have reduced oxygen concentrations. Generally, lower oxygen contents in the liner alloy translates to greater resistance to cracking. In commercially available Zircaloy, the oxygen concentration is made purposely high, about 1000 ppm by weight, so that the Zircaloy is sufficiently strong to withstand the stresses encountered by a cladding tube. Because the inner liners of the structures of this invention need not be particularly strong, the oxygen content of these liner can be reduced to values substantially below that of conventional structural alloys. Zircaloy inner liners of the present invention therefore preferably contain less than about 1000 ppm, more preferably less than about 800 ppm, and most preferably less than about 600 ppm oxygen by weight. Of course, the hardness of other, non-Zircaloy, zirconium alloys can be reduced by decreasing the oxygen and tin concentrations.

In addition to the modified Zircaloys described above, relatively soft and corrosion resistant zirconium alloys suitable for the inner liners of this invention include the dilute iron-chrome alloys, the Zirlos (as described above), and modified versions of these alloys having reduced tin and oxygen contents. Dilute iron-chromium zirconium alloy liners preferably contain about 0.07 to 0.24% iron and about 0.05 to 0.15% chromium by weight. Such alloys are described in U.S. patent application Ser. No. 08/011,559 (attorney docket No. 24-NT-05309, filed on Feb. 1, 1993, naming Rosenbaum, Adamson, and Cheng as inventors, and assigned to the assignee of this application). Still other suitable alloys are the bismuth containing zirconium alloys disclosed in U.S. Pat. No. 4,876,064 (containing between about 0.5 and 2.5 weight bismuth as discussed above in connection with the substrate). Non-zirconium based alloys containing nickel (and iron) such as stainless steel and Inconel may also be employed.

The inner liner should be sufficiently thin that microcracks are prevented from reaching critical depth. If a crack in the inner liner exceeds the critical depth, it could propagate beyond the inner liner and into the barrier and even the substrate. Preferably, the inner liner average thickness is between about 10 and 50 micrometers thick. It should be recognized, however, that thinner layers can be produced with slightly modified fabrication methods such as those employing vapor deposition techniques. In a particularly preferred embodiment, the inner liner is, on average, about 25 micrometers thick.

In one example, the cladding tube total thickness is about 700 micrometers (approximately 28 mils), of which the inner liner or layer occupies less than 15 micrometers (approximately 0.6 mils) and the zirconium barrier occupies about 75 to 115 micrometers (approximately 3.2 to 4.7 mils).

Figure 2:
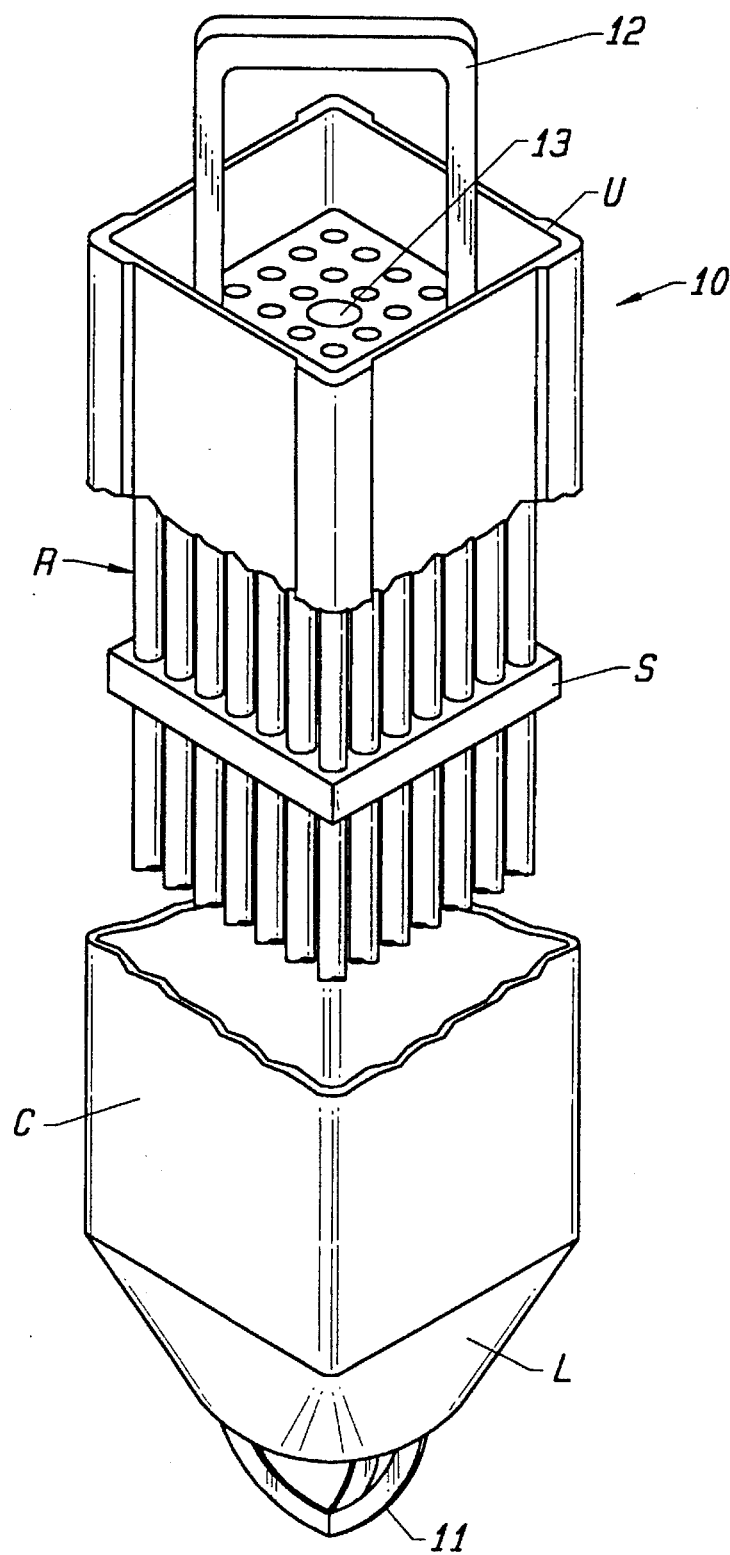
FIG. 2 is a partial cutaway perspective view of a nuclear fuel bundle containing a nuclear fuel rod of FIG. 1.

Referring now to FIG. 2, a cutaway sectional view of a nuclear fuel bundle or assembly 10 is shown. The fuel bundle is a discrete unit of fuel containing many individual sealed fuel elements or rods R each containing a cladding tube of this invention. In addition, the fuel bundle consists of a flow channel C provided at its upper end with an upper lifting bale 12 and at its lower end with a nose piece L and lower lifting bale 11. The upper end of channel C is open at 13 and the lower end of the nose piece is provided with coolant flow openings. The array of fuel elements or rods R is enclosed in channel C and supported therein by means of upper tie plate U and lower tie plate (not shown). Certain of the fuel rods serving to "tie" the tie plates together—thus frequently being called "tie rods" (not shown). In addition, one or more spacers S may be disposed within the flow channel to hold the fuel elements in alignment with one another and the flow channel. During the in service life of the fuel bundle, the liquid coolant ordinarily enters through the openings in the lower end of the nose piece, passes upwardly around fuel elements R, and discharges at upper outlet 13 in partially vaporized condition.

Figure 3:
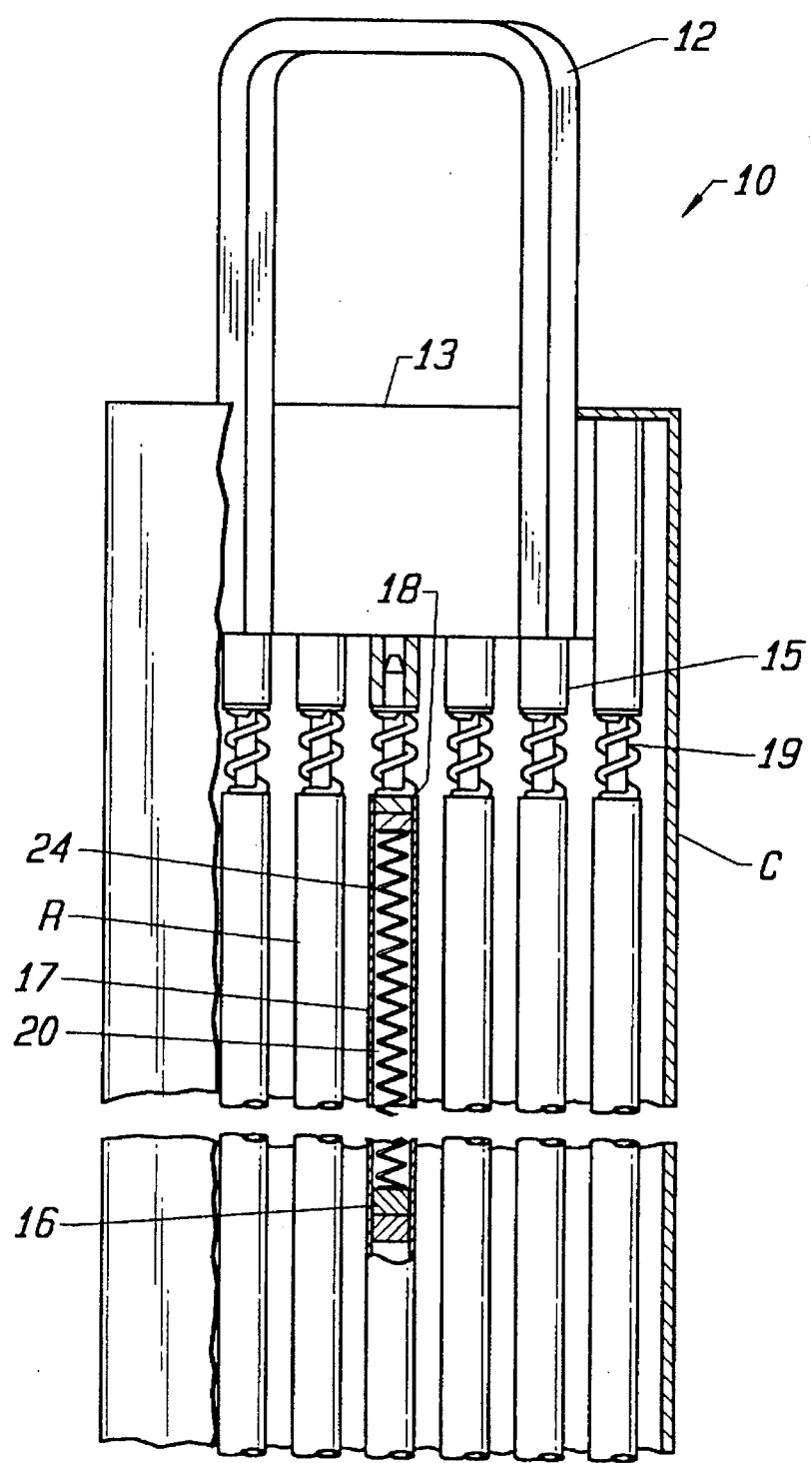
FIG. 3 is a partial cutaway sectional view of a nuclear fuel bundle showing the interior of a fuel rod.

Referring now to FIG. 3, the fuel elements or rods R are sealed at their ends by end plugs 18 welded to the fuel rod container 17, which may include studs 19 to facilitate the mounting of the fuel element in the fuel assembly. A void space or plenum 20 is provided at one end of the element to permit longitudinal expansion of the fuel material 16 and accumulation of gases released by the fuel material. A getter (not shown) is typically employed to remove various deleterious gases and other products of the fission reaction. A nuclear fuel material retainer 24 in the form of a helical member is positioned within space 20 to provide restraint against axial movement of the pellet column during handling and transportation of the fuel element.

II. MANUFACTURE OF THE TUBING

Various methods can be used to fabricate the cladding tubes of this invention. Suitable methods should produce a metallurgical bond between the substrate and the metal barrier and between the metal barrier and the inner liner. Typically, the barrier and inner liner are provided as cylindrical tubes or sleeves that are bonded to the inside surface of a hollow zirconium alloy billet (which forms the substrate in the final cladding). Preferably, the components are bound to one another by coextrusion, but other methods may be employed. For example, the components can also be bonded to the billet by hot isostatic pressing or explosive bonding. In another method, the barrier and inner liner sleeves are bonded to the billet inner surface by heating (such as at 750° C. for 8 hours) to give diffusion bonding between the tubes and the billet. Prior to bonding (by, for example, extrusion), the barrier and inner liner sleeves preferably are joined to the billet at their ends by a bonding process such as electron beam welding in a high vacuum. Electron beam welding is a conventional process in which an electron beam is used to heat the ends of the cylindrical tubes until they fuse.

Extrusion is accomplished by putting the tube through a set of tapered dies under high pressure at about 1000° to 1400° F. (about 538° to 760° C.). Suitable extruders are available from Mannessmann Demang, Coreobolis, Pa. After extrusion, the composite is subjected to a conventional annealing and tube reduction processes to produce a product known as a "tubeshell" which is available in specified dimensions and compositions from various vendors such as Teledyne Wahchang (Albany, Oreg. USA), Western Zirconium (A Westinghouse company of Ogden, Utah), and Cezus (France).

To obtain the final tubing of the necessary dimensions, various manufacturing steps such as cold-working, heat treating, and annealing may be employed. One suitable method of tube reduction involves three passes of about 65 to 80% cold work (conducted with a Pilger mill) followed in each case by a stress relief or recrystallization anneal. The equipment and operating conditions necessary to carry out the various steps will be readily apparent to those of skill in the art, and are described in the following patent applications: (1) U.S. patent application Ser. No. 08/091,672, (2) U.S. patent application Ser. No. 08/215,456, entitled METHOD OF PREPARING FUEL CLADDING HAVING AN ALLOYED ZIRCONIUM BARRIER LAYER, fried concurrently herewith and naming Adamson et al. as inventors, and (3) U.S. patent application Ser. No. 08/215,457, entitled METHOD OF PREPARING FUEL CLADDING HAVING AN ALLOYED ZIRCONIUM BARRIER LAYER filed concurrently herewith and naming Marlowe et al. as inventors. Each of these applications is assigned to the assignee hereof and is incorporated herein by reference for all purposes.

To form the alloyed barrier of this invention, a diffusion anneal is performed whereby some alloying elements from the substrate and inner liner are transported to the zirconium barrier layer to form a partially alloyed barrier layer. As will be apparent to those of skill in the art, the diffusion anneal can be performed with various commercially available pieces of equipment such as a vacuum furnace, an inert gas furnace, or an induction coil. Suitable vacuum annealing furnaces are available from Centorr Vacuum Industries of Nashua, N.H. The details of the processes having suitable diffusion anneals are provided in the above-mentioned U.S. patent application Ser. No. 08/215,456. However, it should be noted that the diffusion anneal should be conducted for a time and at a temperature that is appropriate for thickness of the barrier layer. In other words, the diffusion should be sufficiently controlled that the alloying elements do not diffuse across the entire barrier layer. Rather, the diffusion anneal should provide a diffusion layer as described above. The diffusion anneal can be performed at any stage in the process including at the tubeshell stage or after any cold work step. Usually, the anneal temperature will be between about 650° and 1000 ° C. and last for between about 5 minutes and 20 hours depending upon the barrier layer thickness.

The composite tubing of this invention can be used to make nuclear fuel elements by first affixing a closure to one end of the cladding tube so that only one open end remains. The completed fuel element is then prepared by filling the cladding container with nuclear fuel material, inserting a nuclear fuel material retaining means into the cavity, evacuating the cladding tube interior, pressurizing the interior with helium, applying a closure to the open end of the container, and bonding the end of the cladding container to the closure to form a tight seal there between.

Although the foregoing invention has been described in some detail for purposes of clarity of understanding, it will be apparent that certain changes and modifications may be practiced within the scope of the appended claims. For instance, although the specification has described preferred zirconium alloy tubes, other shapes may be used as well. For example, plates and metal sections of other shapes may also be used. In addition, the Zircaloy-2 described above is an example of an alloy that can advantageously be used in the present invention. Some other zirconium-based alloys as well as other metal alloys having similar structures can in many instances also be used in the methods of this invention.

What is claimed is:

1. A cladding tube having a cross-section, the cladding tube comprising:

a zirconium alloy outer circumferential substrate having an inner surface, the zirconium alloy also having one or more alloying elements;

a zirconium barrier layer bonded to the inner surface of the outer circumferential substrate and having a width defined between its inner and outer surfaces, the barrier layer being alloyed with the one or more alloying elements; and a zirconium alloy inner circumferential liner bonded to the inner surface of the zirconium barrier layer.

2. The cladding tube of claim 1 wherein the zirconium barrier layer has concentration profile in which (a) alloying elements are present at excess concentrations of at least about 0.03 weight percent iron and at least about 0.01 weight percent nickel at the zirconium barrier layer's interface with the inner liner, and (b) substantially no excess alloying elements are present at a distance of at most about 10% of the total barrier layer width from the zirconium barrier layer's interface with the inner liner.

3. The cladding tube of claim 2 wherein alloying elements are present at an excess concentration of at least about 0.03 weight percent iron and at least about 0.01 weight percent nickel at the zirconium barrier layer's interface with the outer circumferential substrate.

4. The cladding tube of claim 2 wherein the alloying elements are present in the zirconium barrier layer's interface with the inner liner in excess concentrations of about 0.03 to 0.4 weight percent iron, about 0.01 to 0.4 weight percent chromium, and about 0.01 to 0.2 weight percent nickel.

5. The cladding tube of claim 1 wherein the outer circumferential substrate comprises Zircaloy-2 or Zircaloy-4.

6. The cladding tube of claim 1 wherein the inner liner comprises a Zircaloy or modified Zircaloy.

7. The cladding tube of claim 6 wherein the inner liner comprises less than about 900 ppm oxygen by weight.

8. The cladding tube of claim 1 wherein the inner liner has an average thickness of between about 10 and 50 micrometers.

9. A fuel element comprising:
a cladding tube including a zirconium alloy outer circumferential substrate having an inner surface, a zirconium barrier layer bonded to the inner surface of the outer circumferential substrate and having a defined width between its inner and outer surfaces, and a zirconium alloy inner circumferential liner bonded to the inner surface of the zirconium barrier layer, wherein the barrier layer is alloyed with iron and/or nickel;
nuclear fuel material disposed within said tube; and
means for sealing the respective ends of said tube with said nuclear material therein.

10. The fuel element of claim 9 wherein the zirconium barrier layer has concentration profile in which
(a) alloying elements are present at an excess concentration of at least about 0.03 weight percent iron and at least about 0.01 weight percent nickel at the zirconium barrier layer's interface with the inner liner, and
(b) substantially no excess alloying elements are present at a distance of 10% of the total barrier layer width from the zirconium barrier layer's interface with the inner liner.

11. The cladding tube of claim 10 wherein alloying elements are present at an excess concentration of at least about 0.03 weight percent iron and at least about 0.02 weight percent nickel at the zirconium barrier layer's interface with the outer circumferential substrate.

12. The cladding tube of claim 9 wherein the inner liner is made from an iron and nickel containing material selected from the group consisting of Zircaloy, modified Zircaloy, stainless steel, and Inconel.

13. A cladding tube having a cross-section, the cladding tube comprising:
a zirconium alloy outer circumferential substrate having an inner surface, the zirconium alloy also having one or more alloying elements;
a zirconium barrier layer bonded to the inner surface of the outer circumferential substrate and having an interior defined between inner and outer surfaces, the distance between the inner and outer surfaces defining a barrier layer width;
a diffusion layer extending from zirconium barrier layer inner surface into the barrier layer interior, the diffusion layer having a maximum concentration of said one or more alloying elements at the barrier layer inner surface and a minimum concentration of said one or more alloying elements in the barrier layer interior; and
a zirconium alloy inner circumferential liner bonded to the inner surface of the zirconium barrier layer.

14. The cladding tube of claim 13 wherein alloying elements are present at an excess concentration of at least about 0.03 weight percent iron and at least about 0.01 weight percent nickel at the zirconium barrier layer's interface with the inner liner, and substantially no alloying elements are present at the diffusion layer's interior side.

15. The cladding tube of claim 14 wherein the diffusion layer is at most between about 10% of the barrier layer width.

16. The cladding tube of claim 13 wherein alloying elements are present at an excess concentration of at least about 0.03 weight percent iron and at least about 0.01 weight percent nickel at the zirconium barrier layer's interface with the outer circumferential substrate.

17. The cladding tube of claim 15 wherein the diffusion layer is at most about 5% of the barrier layer width.

* * * * *